Figure 1:
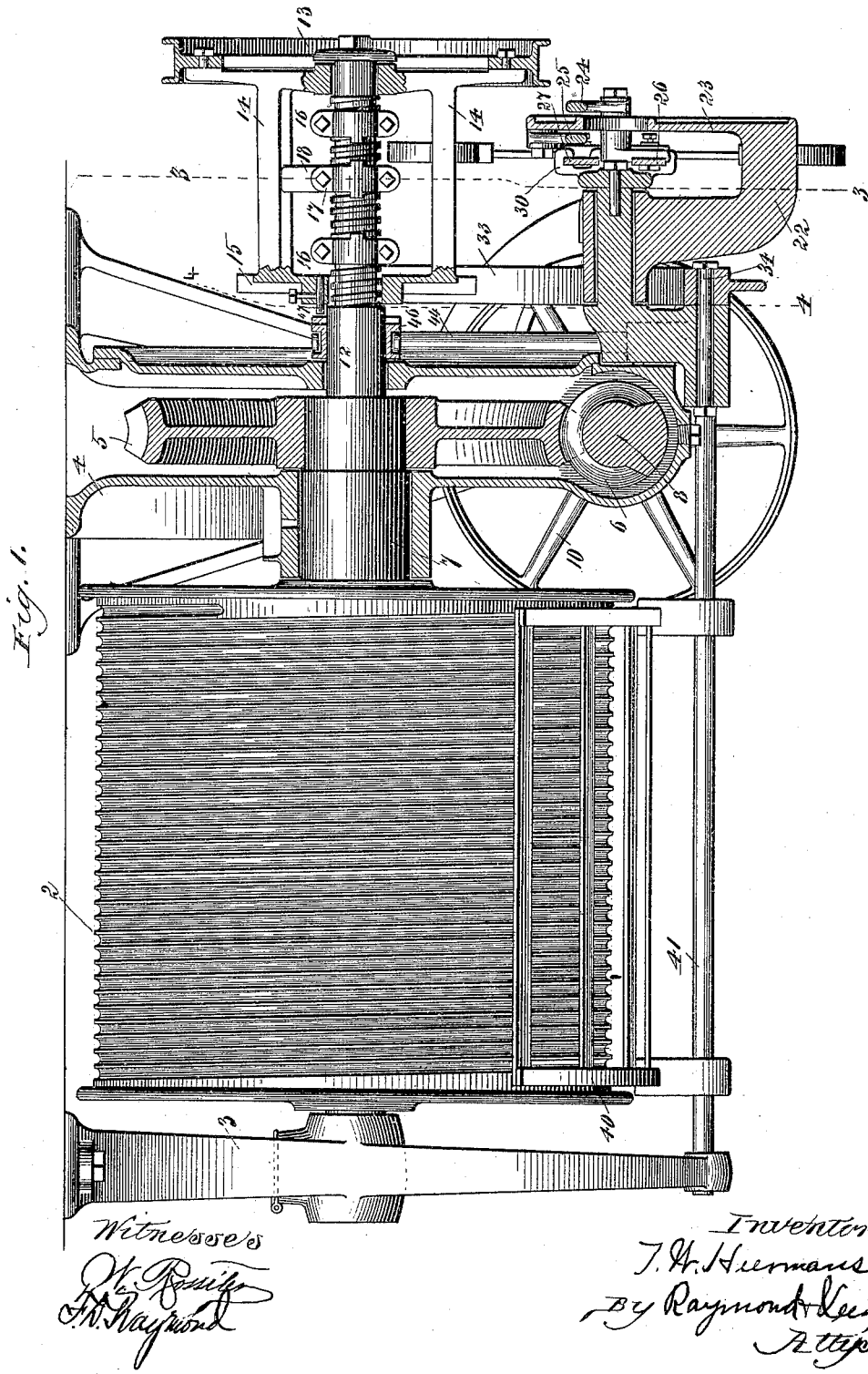

(No Model.)  5 Sheets—Sheet 1.

T. W. HEERMANS.
ELEVATOR.

No. 446,679.  Patented Feb. 17, 1891.

Witnesses:  Inventor
T. W. Heermans
By Raymond & Leeder
Attys.

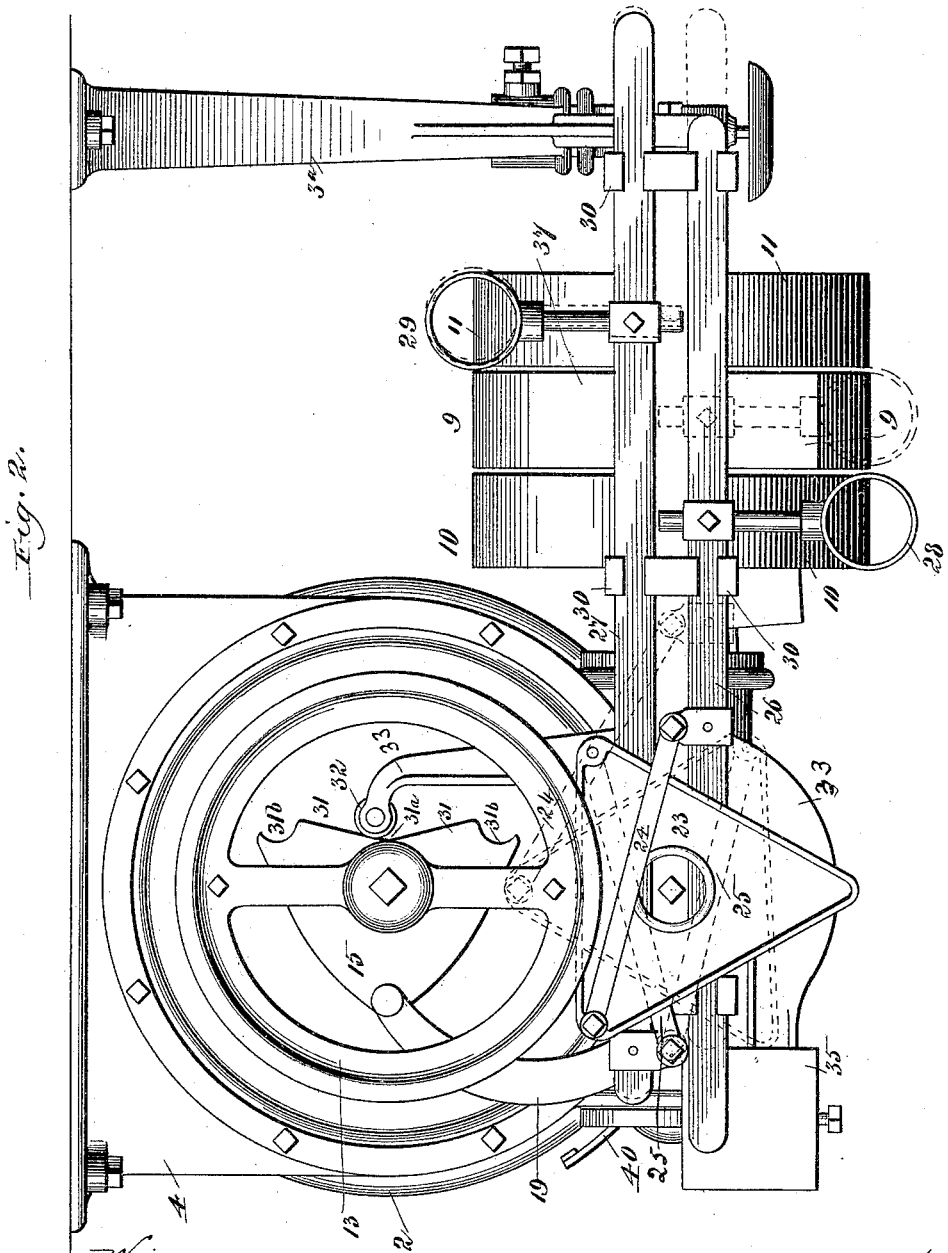

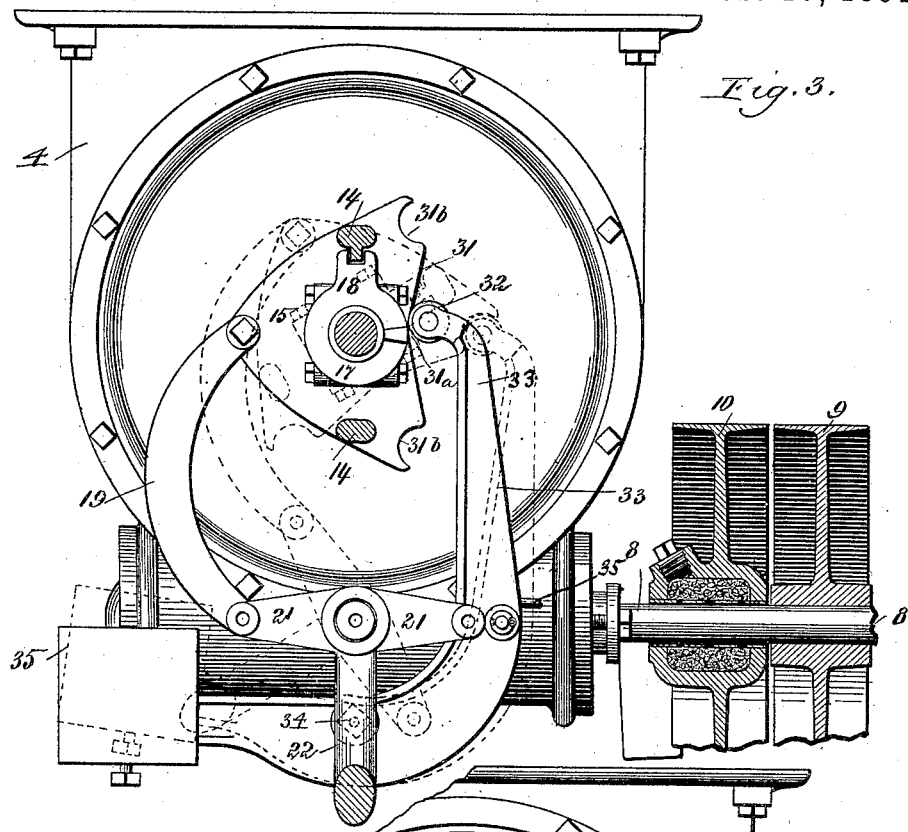

(No Model.)
T. W. HEERMANS.
ELEVATOR.
No. 446,679. 5 Sheets—Sheet 4.
Patented Feb. 17, 1891.
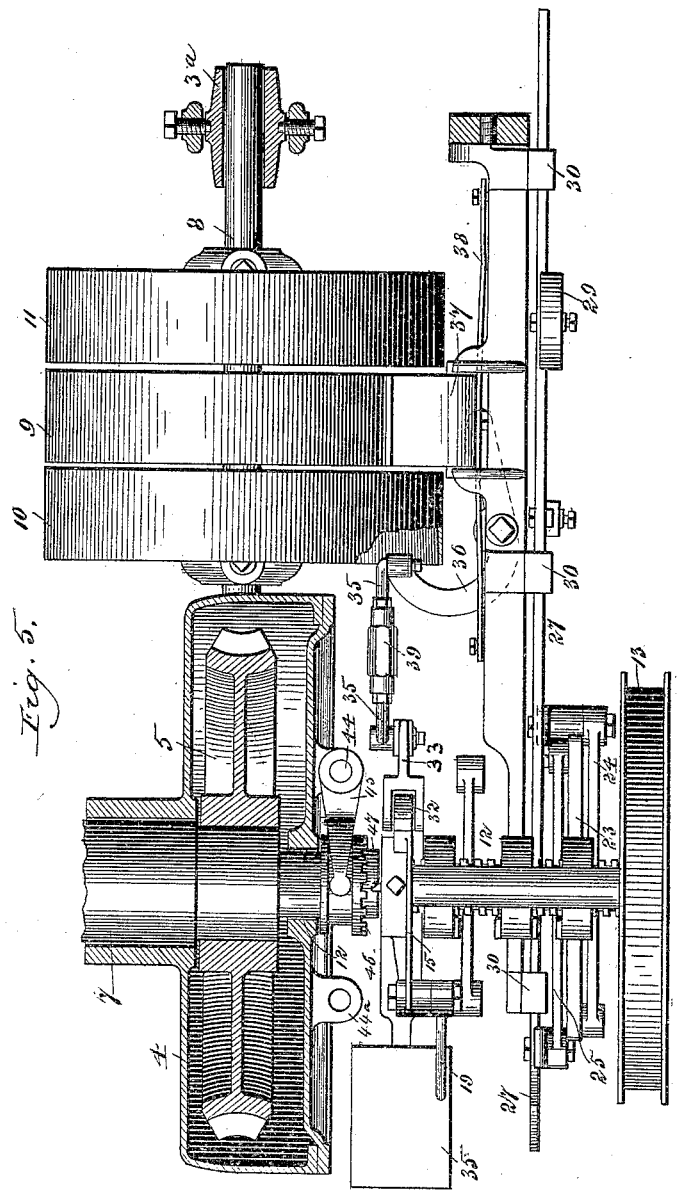
Witnesses
Inventor
T. W. Heermans
By Raymond & Veeder
Attys.

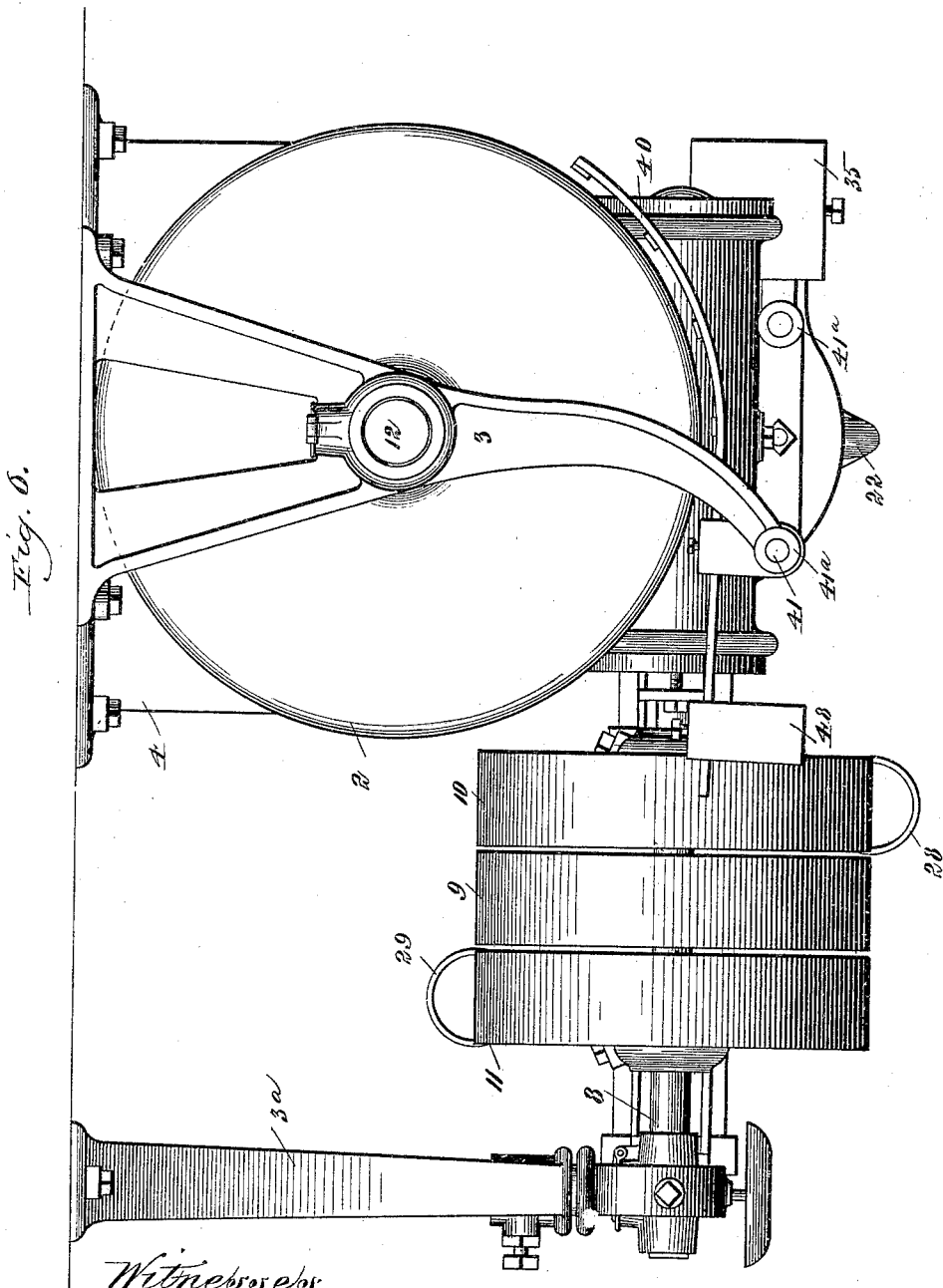

UNITED STATES PATENT OFFICE.

THADDEUS W. HEERMANS, OF CHICAGO, ILLINOIS, ASSIGNOR TO THE CRANE ELEVATOR COMPANY, OF ILLINOIS.

ELEVATOR.

SPECIFICATION forming part of Letters Patent No. 446,679, dated February 17, 1891.

Application filed August 19, 1890. Serial No. 362,423. (No model.)

*To all whom it may concern:*

Be it known that I, THADDEUS W. HEERMANS, of Chicago, in the county of Cook and State of Illinois, have invented certain new and useful Improvements in Elevators, of which the following is a specification.

My improvements relate more especially to elevators for use in shops and factories where there is a continuous power, and the elevator is stopped and started by means of shifting belts upon tight and loose pulleys, though in some of its features, as will hereinafter appear, my invention is applicable to elevators generally.

Among the objects of my invention may be named the provision of devices for preventing the overrunning of the elevator, it being automatically brought to rest when the car or cage has reached the limit of its travel either upward or downward, the preventing of accidents by reason of the slacking of the hoisting-rope either through the sticking of the cage or of other parts; the provision of devices for shifting the belts upon the tight and loose pulleys, so that the movement of one belt is practically finished before that of the other begins, thereby preventing wear and burning of the belts by slipping; to secure the proper shifting of each belt so that it will either be fully on or entirely off the tight pulley and will not be liable to stop in an intermediate position, and, further, to make the elevator applicable in any situation relative to the shafting by which it is driven by so constructing the working parts that they may be reversed relatively to the hoisting-drum without essential change in their construction or operation.

In the accompanying drawings, Figure 1 is a side elevation of the apparatus, the driving and operating gearing being partially in section. Fig. 2 is an end view of the elevator. Fig. 3 is a vertical cross-section on line 3 3, Fig. 1. Fig. 4 is a like section on line 4 4, Fig. 1. Fig. 5 is a plan view of the driving and shifting mechanism, the hoisting-drum not appearing therein. Fig. 6 is an elevation of the end opposite to that shown in Fig. 2.

2 is the hoisting-drum journaled at one end of the hanger 3 and at the other in the hanger 4. The last-named hanger has the form of a hollow casing surrounding the worm-gear 5 and the worm 6. The worm-gear is keyed or otherwise secured to the trunnion 7 of the drum 2, and the worm 6 is secured on the shaft 8, the outer end of which is provided with the tight pulley 9, Fig. 2, and the loose pulleys 10 11, said outer end being supported by a hanger $3^a$. The journal or shaft 12 of the drum 2 is prolonged beyond the casing 4, and is threaded part way on its outer end, the extreme portion, however, being plain and affording a bearing for the shifting-wheel 13. The connection 13 for the shifting-rope (the latter not herein shown) need not necessarily take the form of the wheel, as lever or a sector of a circle is often used for this purpose; but throughout the specification and claims I use the term "wheel" to designate this part, as that is the specific form herein shown, but it is with the express understanding that any equivalent device may be used without departing from the invention. From the shifting-wheel 13 extend arms 14 14, parallel to and on opposite sides of the shaft 12 and at the inner end of said arms is a cam-plate 15. (Compare Figs. 1 and 2.) Both the cam-plate 15 and the shifting-wheel 13 are fitted so as to permit the shaft 12 to revolve easily therein. Upon the threaded portion of shaft 12 and within the frame formed by the disk 15 the arms 14 14 and the shifting-wheel 13 are fixed clamps 16 and nut 17, the latter being provided with a spur 18 engaging with the arm 14. The cam 15 is connected to the belt-shifting device through the arm 19 and to the brake mechanism by the arm 33. The connection to the belt-shifting mechanism is seen by comparison of Figs. 1, 2, and 3. In Fig. 3 the arm is shown as connected to the rocker 21, the latter having an arm 22, which projects outward, as seen in Fig. 1, and at its outer end is extended upward, and is flattened to form a triangular plate 23. The upper angles of said plate 23 are above the center of vibration of the arm 22 and of the plate and form pivotal points, to which links 24 25 are connected at one end, the other ends of said links being connected to the belt-shifting slides 26 27. Said slides carry belt-guides 28 29, and are supported by guides 30, attached to the frame-work of the machine. The manner in which the movement of the belts is effected by the movement of the plate 23, imparted through the intervention of the cam 15 and link 19 from the shifting-wheel 13, is illustrated in dotted lines in Fig. 2. The turning of the plate to the right, as shown in dotted lines, causes the link 24 to shift its attached slide 26 and belt-guide 28 carried thereby to the position shown in dotted lines, so that the belt guided thereby is moved over to the tight pulley 9. The link 25 by the same motion imparts but a very small amount of movement to its attached slide and belt-guide 27 29, because it simply swings past the center of motion of the disk or plate 23.

When it is desired to reverse the elevator, and the disk 23 is turned to the extreme left instead of the extreme right, as shown in dotted lines, it is evident that the belt-guide 28 will have moved entirely out of range with the tight pulley 9 before the belt-guide 29 begins to move, so as to bring its belt upon the tight pulley 9, the result being that both belts cannot be on or partially on the pulley 9 at the same time. The slipping and burning of the belts, resulting from both being on the same pulley at once, as well as the disagreeable shrieking resulting therefrom, are thus avoided, this result being attained by the peculiar arrangement of the links 24 25 with reference to the center of vibration of the disk 23, whereby each link is alternatively swung equidistantly past the center of vibration of the disk 23, accordingly as the same is turned one way or the other from its central position, the other link at the same time vibrating upon one side of the center of disk 23.

To prevent the overrunning of the elevator and bring the car to rest at the limits of its travel both above and below, the clamps 16 16 and the nut 17 upon the shaft 12 are employed. It is evident that as the drum 2 and its attached shaft 12 revolve, the shifting-wheel 13, being held stationary, will keep the nut 17 from revolving, and the latter will travel endwise upon the shaft 12 as the same revolves. The clamps 16 are so placed with reference to the nut 17 as that the latter will come in contact with them when the drum has made a number of revolutions corresponding to the travel of the car. The contact of either clamp 16 with the nut 17 will cause the latter to revolve, carrying with it the arm 14 and the shifting devices connected thereto, the result being that the disk 23 will be brought into its central position and the driving-belt shifted to its loose pulley, the elevator being thereby stopped. To insure the speedy stoppage of the elevator, whether raising or lowering a load, a brake is employed, which is automatically applied whenever the shifting devices assume their central position, in which position the belts are both on their respective loose pulleys. The brake apparatus is shown in Figs. 3 and 5.

The cam-plate 15, before mentioned, has a face 31, which approaches the center of the cam most nearly in its middle portion $31^a$. At each end of the face 31 is a semicircular depression $31^b$, fitted to the roller 32 in the end of the lever 33. The lever 33 is pivoted at 34 to the frame-work, (see, also, Fig. 1,) and carries at its lower extremity a weight, which maintains the roller 32 at its upper end always in contact with the cam-face 31. Pivoted to the lever 33 is a rod 35, Fig. 5, which is connected through lever 36 to the brake 37, the latter being adapted to make contact with the tight pulley 9, and being mounted upon a spring 38, attached to the frame-work, so as to be retracted thereby when not pressed forward by the lever 36. To adjust the relation of the parts and provide for wear of the brake-lock 37, a right and left nut or turnbuckle 39 is used to join the two parts of the rod 35. The weight, acting through the lever 33, is made sufficient to apply the proper braking force to the pulley 9 whenever the position of the cam is such as to bring the point $31^a$ opposite to the roller 32, as seen in full lines in Fig. 3. The shifting of the cam-plate 15 of the shifting-wheel 13, so as to start the elevator in either direction, brings one or the other of the recesses $31^b$ in apposition to the roller 32, and as these depressions are farther from the center of the cam-plate, the lever 33 is therefore moved sufficiently to free the brake. If the cam-plate, however, is not shifted sufficiently to bring the recesses $31^b$ opposite to the roller 32, the weight, acting upon the straight portion of the cam-face 31, restores the cam-plate 15 to its original central position and the elevator is stopped. This prevents the burning and destruction of the belt by slipping on account of being moved only partially on the tight pulley, and likewise the starting of the elevator by accidental shifting of the belts.

Figs. 1, 4, and 6 show the provision for stopping the elevator in case the hoisting-rope should become slack by the stoppage or sticking of the car in the shaft or from any other cause. Underneath the hoisting-drum 2 is a pivoted frame or apron 40. On the end of the shaft 41, to which the cradle is fixed, is a bevel-gear 42, (vide Fig. 4,) meshing with a similar gear 43 on the shaft. The upper end of shaft 44 is provided with a clutch-fork 45, which operates a sliding clutch 46 upon the shaft of the hoisting-drum. In its usual situation the clutch 46 revolves freely with the hoisting-drum, as seen in Fig. 1; but if the rope should slack and the weight of the loose coil come upon the apron 40 the latter will be depressed and shaft 42 revolved, thereby moving the shaft 44 and throwing the clutch 46 in engagement with a pin 47, projecting from the cam-plate 15, the effect being to move the shifting-gearing and bring the elevator to a state of rest.

As the stop just described for bringing the car to a state of rest in case the cable becomes slack is only of use when the car is being lowered, the pin 47 of the teeth of the clutch 46, or both, are made slanting upon one side, (in the drawings the side of the pin 47 is made tapering,) so that when the motion of the elevator is reversed the clutch and pin will become disengaged. Upon the disengagement of the clutch and the tightening up of the hoisting-rope by the reversal of the elevator the apron will resume its original position, a counterbalance-weight 48 being attached to an arm of the apron for said purpose. (*Vide* Fig. 6.) The counterbalance-weight 48 may be shifted on its arms so that the sensitiveness of the apron 40 can be perfectly regulated.

It will be seen with reference to the figures (Figs. 3 and 4 particularly) that the rocker-arm 21 extends on both sides of the pivotal point, the link 19 being connected, however, to one end thereof; also, that duplicate bearings 41ª and 44ª are provided for the shafts 41 and 44. By this means provision is made for allowing the placing of the belt-pulleys 9 10 11 and their connected mechanism, including the belt guides and slides, on either side of the drum as may suit the particular situation, corresponding changes in the position of the apron 40 and its connected mechanism being also provided for. The cam-plate 15 and the connected link 19 may be correspondingly shifted by simply turning the cam-plate half around on shaft 12 and changing the connection with the link 19 to the opposite end of the rocker 21. The lever 33 is likewise constructed so as to be correspondingly shifted simply by reversing the direction in which it faces.

What I regard as new, and desire to secure by Letters Patent, is—

1. The combination, with an elevator, of a drum-shaft projecting beyond the supporting-bearing and threaded as to a portion of its length, a shifting-wheel mounted thereon and having arms extending parallel with said shaft, a cam-plate at the opposite end of said arms, a nut fitted to the threaded portion of said shaft and connected to one of said arms by a projecting spur, clamps fitted to said shaft on each side of said nut, slides operating the belts by which the elevator is driven, a vibratable disk connected to said slides by links and operated by said cam-plate through link and lever connections, a clutch upon said drum-shaft operated by a tilting apron beneath the drum and adapted to make connection with said cam-plate when the arm is tilted by contact with the slack cable, a lever operating upon the face of said cam-plate, a brake adapted to act upon the tight pulley, and connections from the said brake to the last-named lever, all combined substantially as described, whereby the shifting mechanism may be operated by hand by the slacking of the hoisting-cable or by the cage reaching the limit of its travel, the brake being automatically applied whenever the shifting mechanism is brought in a position to stop the elevator.

2. The combination, in an elevator operated by belts, of a belt-shifting device consisting of slides operating the belt-guides, a vibratable disk or plate, and links pivoted at one end to said slides and at the other to said plate, so as to lie both on one side of the center of vibration of said plate when in its central position and to vibrate past the center of said plate, alternatively, as the latter is vibrated to one side or the other of its central position, substantially as described.

3. The combination, with the shifting devices of a belt-driven elevator, of a cam-plate 15, having a cam-face 31, provided with a central depression 31ª and outer cavities 31ᵇ, a lever 33, whose end is maintained in contact with said face by a weight, a brake 37, acting upon the tight pulley 9, and a rod and lever 35 36, connecting said brake and the lever 33, substantially as described.

4. The combination, with the shifting devices of a belt-driven elevator, of a cam-plate 15, having a cam-face 31, provided with a central depression 31ª and outer cavities 31ᵇ, a lever 33, whose end is maintained in contact with said face by a weight, a link 19, pivoted to said cam-plate and to a rocker 21, said rocker having an arm 22 and an upward extension thereof 23, links 24 25, pivoted to said plate 23 and to belt-shifting slides 26 27, all combined substantially as described, whereby the shifting mechanism is brought to its central position automatically unless the belts are fully shifted to put the elevator in motion in one direction or the other.

THADDEUS W. HEERMANS.

Witnesses:
 IRWIN VEEDER,
 TODD MASON.